United States Patent [19]

Miyahara

[11] Patent Number: 5,058,192
[45] Date of Patent: Oct. 15, 1991

[54] METHOD OF AND APPARATUS FOR PREPARING FOODS BY UTILIZING ELECTRIC HEATING

[75] Inventor: Kingo Miyahara, Tokyo, Japan

[73] Assignee: Dowa Co., Ltd., Tokyo, Japan

[21] Appl. No.: 531,241

[22] Filed: May 31, 1990

Related U.S. Application Data

[62] Division of Ser. No. 467,433, Jan. 19, 1990.

[30] Foreign Application Priority Data

Jan. 19, 1989 [JP] Japan .............................. 01-010432

[51] Int. Cl.[5] .............................................. H05B 3/60
[52] U.S. Cl. .................................. 392/311; 392/213; 392/314; 392/338; 99/358; 219/10.55 E
[58] Field of Search ............... 219/280, 281, 282, 283, 219/284, 285, 287, 288, 289, 290, 292, 293, 294, 201, 10.55 R, 10.81, 200, 10.55 E; 99/358, 375, 561; 392/311, 338, 313, 314, 500

[56] References Cited

U.S. PATENT DOCUMENTS

| | | |
|---|---|---|
| 2,310,690 | 2/1943 | Griffith . |
| 3,062,663 | 11/1962 | Furgal et al. . |
| 3,230,861 | 1/1966 | Korr ..................................... 219/284 |
| 3,543,673 | 12/1970 | McDevitt ............................ 219/288 |
| 4,109,566 | 8/1978 | Vigerstrom ........................... 99/358 |

FOREIGN PATENT DOCUMENTS

| | | |
|---|---|---|
| 40578 | 1/1985 | Australia . |
| 57431 | 5/1985 | Australia . |
| 432121 | 2/1939 | Belgium . |
| 911164 | 5/1954 | Fed. Rep. of Germany . |
| 1263199 | 3/1968 | Fed. Rep. of Germany . |
| 1565520 | 5/1969 | France . |

Primary Examiner—Bruce A. Reynolds
Assistant Examiner—Tu Hoang
Attorney, Agent, or Firm—Pollock, Vande Sande & Priddy

[57] ABSTRACT

A container having an open upper end is provided with a moisture permeable film member disposed inside the container in such a manner that two outer surfaces of the film member face two mutually opposing inner surfaces of the container, and with a pair of electrodes disposed in the gaps formed between these inner and outer surfaces. A food material, a suitable amount of electrolyte and a suitable amount of water are placed within the moisture permeable film member, and they are then cooked by being subjected to warming or heating by supplying electricity to the electrodes so that current flows therebetween.

13 Claims, 6 Drawing Sheets

METHOD OF AND APPARATUS FOR PREPARING FOODS BY UTILIZING ELECTRIC HEATING

This is a divisional of Ser. No. 07/467,433, filed on Jan. 19, 1990.

BACKGROUND OF THE INVENTION

The present invention relates to a method of preparing foods by utilizing electric heating in which a food material received in a container, such as Chinese-style or wheat noodles, a rice-cooking material, beans, peas, or soup such as miso-soup, is warmed or heated while remaining in the container within a short period of time by the action of a pair of electrodes which are provided in mutual opposition in the container and between which current flows. The present invention also relates to an apparatus for carrying out the method.

Among various types of instant food, a certain type, including Chinese-style or wheat instant noodles, and instant soups such as miso-soup, has been known for its capability of being quickly prepared. In general, such food is prepared to be served simply by pouring boiling water into a disposable container receiving the food. During manufacture, such instant food is subjected to a certain drying process so that the food will recover its original state when boiling water is poured, and it will then be readily served. These features of certain instant food and the process enabling them are known from prior art, e.g., from Japanese Utility Model Publication No. 56-23253.

Such conventional instant food, however, involves several drawbacks. For instance, when the temperature of hot water poured into the container is low, this inevitably results in the food being only insufficiently heated. In such cases, because the food is not sufficiently heated, it sometimes fails to become edible even if it has been duly processed during manufacture. If instant food is insufficiently heated, in order to compensate for the insufficient heating, it is necessary to again place the food in a container such as a pot and further heat it, or to pour fresh boiling water.

Since the standard of people's diets has improved, consumers tend to prefer genuine food. This tendency has increased in recent years, and an increasing proportion of food materials manufactured as instant food materials turns out to be goods that are not welcomed by consumers because their tastes and other properties of producing enjoyable sensations are regarded as being inferior. In particular, such instant food materials as Chinese-style noodle materials and processed rice materials, which are manufactured by puffing and, thereafter, drying, often fail to satisfy consumers.

SUMMARY OF THE INVENTION

The present invention has been accomplished in view of the above-described problems of the prior art.

It is an object of the present invention to provide a method of and an apparatus for preparing foods by utilizing electric heating that are capable of cooking by warming and/or heating foods, which may be either food materials processed as instant food or those unprocessed, within a container receiving the foods together with water, by the action of a pair of electrodes being disposed opposite each other in the container and allowing the flow of current therebetween, without requiring the use of hot water or an electronic oven.

It is another object of the present invention to provide such a method and an apparatus that are capable of sufficiently heating a food material received within the container within a very short period of time, hence, capable of cooking unprocessed food materials as well, such as a Chinese-style noodle material and an ordinary rice material including unprocessed rice, so as to prepare them to be served.

It is still another object of the present invention to provide such a method and an apparatus that are capable of preparing electrically heated foods in such a manner that the container can be disposed when the food has been finished, thereby enabling very cheap preparation of foods.

In order to achieve the above-stated objects, according to a first aspect of the present invention, a method of preparing foods by utilizing electric heating comprises the steps of: preparing a container having an open top, a moisture permeable film body disposed inside the container in such a manner that two outer surfaces of the film body face two mutually opposing inner surfaces of the container, and a pair of electrodes disposed in the gaps between the two mutually opposing inner surfaces of the container and the two outer surfaces of the film body; placing a food material, a suitable amount of an electrolyte and a suitable amount of water within the moisture permeable film body inside the container; and cooking the food material by subjecting it to warming or heating by supplying electricity to the electrodes so that current flows therebetween.

According to a second aspect of the present invention, a method of preparing foods by utilizing electric heating comprises the steps of: preparing a container having an open top, a moisture permeable film body disposed inside the container in such a manner that two outer surfaces of the film body face two mutually opposing inner surfaces of the container, and a pair of electrodes disposed in the gaps between the two mutually opposing inner surfaces of the container and the two outer surfaces of the film body; placing a food material, a suitable amount of an electrolyte and a suitable amount of water within the moisture permeable film body inside the container; and cooking the food material by subjecting it to warming or heating by supplying electricity to the electrodes so that current flows therebetween. In an early stage of the supply of electricity, an electrolyte and water are supplied to the electrodes so as to promote the flow of current.

According to a third aspect of the present invention, a method of preparing foods by utilizing electric heating comprises the steps of: preparing a container having an open top, a pair of electrodes disposed on two mutually opposing inner surfaces of the container, and moisture permeable film bodies covering the surfaces of the electrodes; placing a food material, a suitable amount of an electrolyte and a suitable amount of water within the container; and cooking the food material by subjecting it to warming or heating by supplying electricity to the electrodes so that current flows therebetween.

According to a fourth aspect of the present invention, a method of preparing foods by utilizing electric heating comprises the steps of: preparing a container having an open top, a pair of electrodes disposed on two mutually opposing inner surfaces of the container, and moisture permeable film bodies covering the surfaces of the electrode; placing a food material, a suitable amount of an electrolyte and a suitable amount of water within the container; and cooking the food material by subjecting it to warming or heating by supplying electricity to the electrodes so that current flows therebetween. In an early stage of the supply of electricity, an electrolytic substance is supplied to the electrodes so as to enhance the flow of current.

According to a fifth aspect of the present invention, an apparatus for carrying out the above-specified methods of the present invention comprises: a container which has an open upper surface and two mutually opposing inner surfaces; a moisture permeable film body of a configuration substantially corresponding to that of the container, the film being disposed inside the container and having two outer surfaces facing the two mutually opposing inner surfaces of the container; and a pair of electrodes disposed in mutual opposition and in the gaps between the two mutually opposing inner surfaces of the container and the two outer surfaces of the moisture permeable film body, each end of one of the electrodes extending to the edge around the upper open end of the container to form a pair of electrical contact portions. In a preferred embodiment of the fifth aspect of the present invention, either of the inner periphery of the container and the outer periphery of the moisture permeable film body is already supplied with an electrolytic substance. Alternatively, the electrodes may be already supplied with an electrolytic substance. Still alternatively, all of the inner periphery of the container, the electrodes and the outer periphery of the moisture permeable film body are already supplied with an electrolytic substance. This supply of an electrolytic substance is advantageous to the promotion of the flow of current. In another preferred embodiment of this aspect, a stepped portion with an increased diameter is formed at an upper position of the inner surface of the container, or a space is defined between such an increased-diameter stepped portion of the container and the mated portion of the moisture permeable film body disposed inside the container. This arrangement makes it possible to dissipate boiling bubbles, and also to prevent them from flowing over the edge around the upper open end of the container.

According to a sixth aspect of the present invention, an electrically heating food-preparation apparatus comprises: a container which has an open top and two mutually opposing inner surfaces; a pair of electrodes disposed in mutual opposition on the two mutually opposing inner surfaces of the container; and moisture permeable film bodies covering the surfaces of the electrodes, one end of one of the electrodes and that of the other extending to the edge around the upper open end of the container to form a pair of electrical contact portions. The apparatus having the above-specified arrangement allows electricity to be effectively supplied to the pair of electrodes whenever necessary.

In a preferred embodiment of the sixth aspect of the present invention, the entire structure of each of the moisture permeable film bodies is formed into a shape of a bag in which one of the electrodes is received with advantageous effects. If an electrolytic substance is already supplied into the moisture permeable film bodies covering the electrodes, this enables further enhancement of the flow of current.

In a preferred embodiment of the fifth or sixth aspect of the present invention, the edge around the upper open end of the container has mutually opposing portions which slightly project outwardly, and the ends of the electrodes are respectively extended to the projected portions to form a pair of electrical contact portions. Alternatively, the edge around the open top of the container has a portion on one side thereof which slightly projects outwardly, both of the ends of the electrodes are extended in a parallel manner to the single projected portion to form a pair of electrical contact portions. The adoption of either of these arrangements facilitates the supply of electricity to the pair of electrodes.

A food material, which may be any food material desired, is cooked by warming or heating it within a short period of time in the following manner if, for instance, the method according to the first aspect of the present invention is carried out using, for instance, the apparatus shown in FIG. 1, according to the fifth aspect of the present invention. First, a moisture permeable film body is disposed over the entire inner surface of a container of the apparatus which has an open top. A pair of electrodes is disposed in mutual opposition and in the gap between two lateral inner surfaces of the container and the mated two lateral outer surfaces of the film body. In this condition, a food material to be cooked and an electrolyte and water are placed inside the container.

When this is completed, water containing electrolyte quickly permeates through the moisture permeable film body, thereby bringing the film body into its wet state, and comes into contact with the pair of electrodes disposed on the two lateral outer surfaces of the film body. In this way, the food material and the pair of electrodes are brought into a state of being electrically conductive to each other through water containing electrolyte. When electricity is supplied through electrical contact portions formed by those ends of the electrodes which are extended to mutually opposing portions of the upper edge around the upper open end of the container, current flows through the moisture permeable film body, whose entire structure is in its wet state, and flows within the food material which contains electrolyte. The thus flowing current causes a quick rise in temperature of the food material and water by the action of Joule's heat, thereby bringing the food material and water to the boil.

By virtue of the above-described quick heating, the food material is quickly heated and cooked within the container, invariably with the type of food material, that is, whether the food material is an instant food material which has previously been subjected to a certain process in accordance with the conventional practice and which can readily recover its original state upon exposure to boiling water, or a raw or unprocessed food material which is normally cooked in a common pot.

The amount of current that flows between the pair of electrodes during electric heating the increase with increases in the concentration of electrolyte (e.g., salt) added to the food material. If a high concentration of electrolyte is used, therefore, this enables a corresponding reduction in the time that passes before the food material and water inside the container come to the boil. The above-described principle is adopted in the method according to the second aspect of the present invention. Specifically, in this method, in an early stage of the supply of electricity, an electrolyte (for example, salt) and water are supplied to the pair of electrodes. In this way, if a small amount of, for example, salt water, is supplied to the outer surfaces of the moisture permeable film body, the outer surfaces of the moisture permeable film body and the pair of electrodes become wet with the solution, thereby facilitating electrical conduction. Therefore, in the method according to the second aspect of the present invention, the wetting of the moisture permeable film body during an early stage of the electric heating is promoted from the outer side of the film body, so as to promote the flow of current.

The methods according to the third and fourth aspects of the present invention are distinguished from those according to the first and second aspects where a moisture permeable film body is disposed over the entire inner surface of the container in that only the pair of electrodes disposed in mutual opposition in the container are covered by moisture permeable film bodies. This arrangement is advantageous in that the methods can be easily applied to the cases of containers having various different configurations. If the configuration of containers differs from one to another, this makes it difficult for a moisture permeable film body of the type used in the first and second aspects of the present invention to be disposed over the inner surface of a container. According to the third or fourth aspect of the present invention, while a pair of electrodes whose surfaces are covered by moisture permeable film bodies are disposed on two mutually opposing inner surfaces of a container opening at its upper end, a food material, a suitable amount of an electrolyte and a suitable amount of water are placed within the container. Thereafter, electricity is supplied to the pair of electrodes so that current flows therebetween. As a result, the food material and water are heated by the thus generated Joule's heat so as to warm or heat the food material to cook it within a short period of time.

According to the fourth aspect of the present invention, in an early stage of the supply of electricity, an electrolytic substance (e.g., salt) may be supplied to the electrodes received in the moisture permeable film bodies so as to enhance the flow of current.

Figure 6:
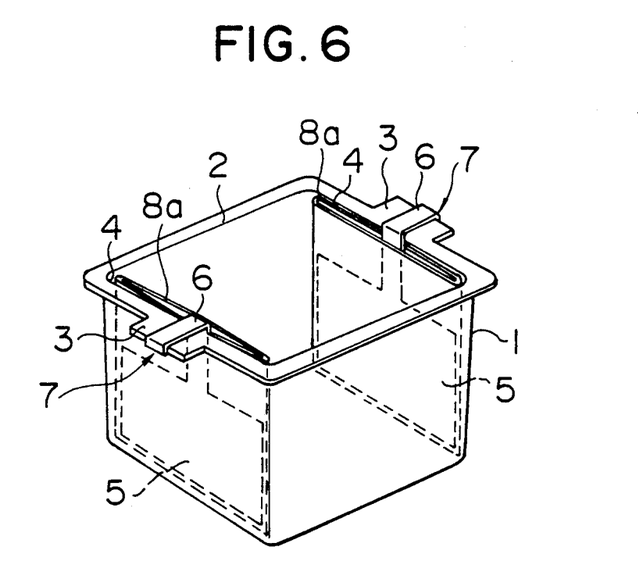
FIG. 6 is a perspective view of an electrically heating food-preparation apparatus, illustrating still another embodiment, with bag-shaped moisture permeable film bodies disposed mutually opposed in a container.
Figure 7:
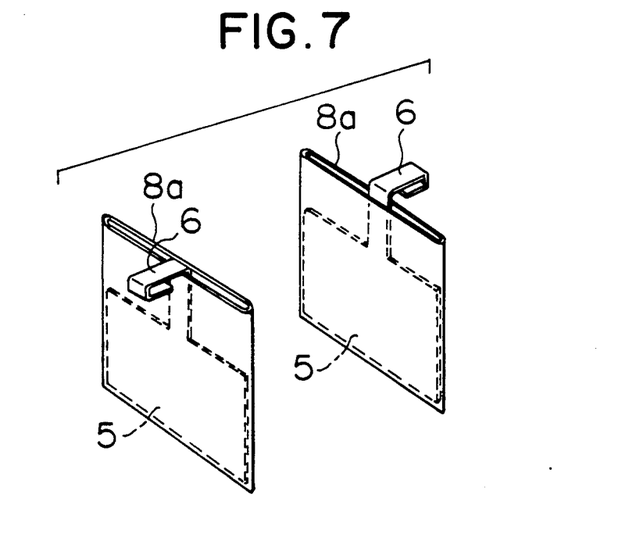
FIG. 7 is a perspective view of the bag-shaped moisture permeable film bodies each receiving an electrode.

If each of the moisture permeable film bodies is formed as a bag-shaped body, as shown in FIGS. 6 and 7, and the electrodes are received in these bag-shaped film bodies, the moisture permeable film bodies with the electrodes received therein can be disposed mutually opposing on two mutually opposing inner surfaces of the container even when a food material and water are already received inside the container, and electric heating can be easily entered. This arrangement may be also combined with the supply or the addition of an electrolytic substance (e.g., salt) to the inside of the bag-shaped moisture permeable film bodies. In this case, the thus supplied or added electrolyte quickly absorbs moisture of the food material through the moisture permeable film bodies, thereby promoting the wetting of the film bodies, hence, promoting the electrical conduction between the electrodes and the food material.

BRIEF DESCRIPTION OF THE DRAWINGS

FIGS. 9A to 9E show various ways of establishing electrical contact, wherein

DESCRIPTION OF THE PREFERRED EMBODIMENT

Figure 1:
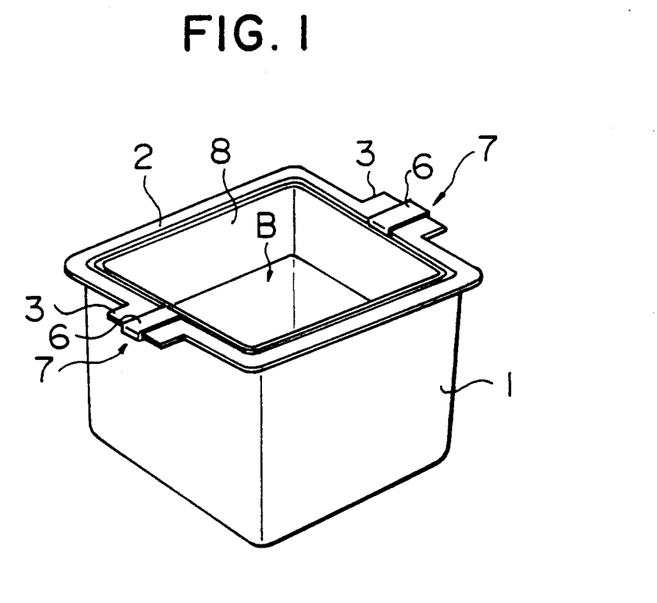
FIG. 1 is a perspective view of the entire structure of an apparatus for preparing foods by utilizing electric heating, illustrating one embodiment of the present invention.
Figure 2:
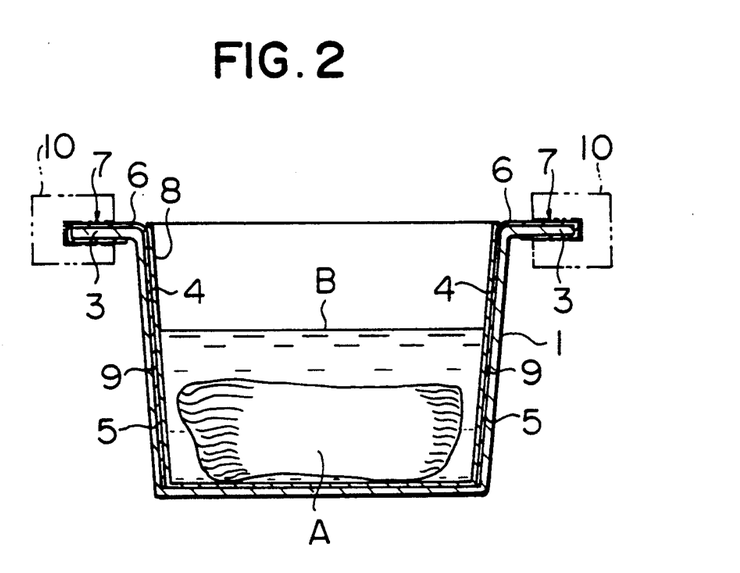
FIG. 2 is a vertical sectional view of the apparatus shown in FIG. 1, taken from the front.
Figure 3:
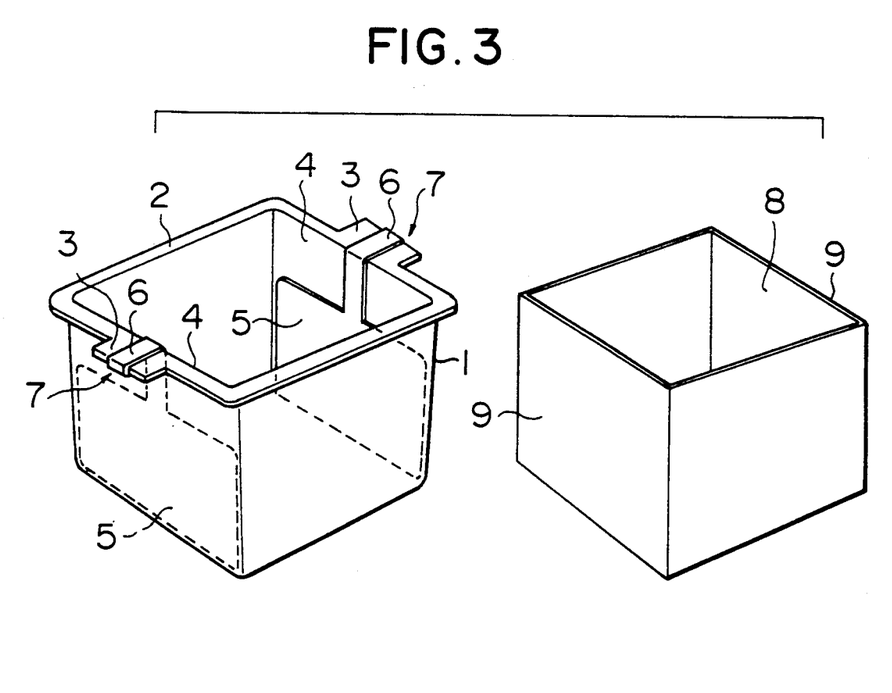
FIG. 3 is a perspective view of the apparatus partially disassembled.

FIGS. 1 to 3 illustrate an embodiment of an apparatus according to the present invention which effects electric heating to prepare foods within a short period of time by warming or heating a food material such as the food material A shown in FIG. 2. The electrically heating food-preparation apparatus includes a container 1 having a closed-end configuration with an open top and being formed of an insulating material. The container 1 may be formed by using any suitable material such as a synthetic resin, or waterproof paper whose surfaces are coated with films. The edge 2 around the upper open end of the container 1 slightly projects outwardly in the horizontal direction. Portions of the edge 2 which laterally oppose are further outwardly projected, as denoted at 3. One end 6 of an electrode 5 and one end 6 of another electrode 5, which constitutes a pair of electrodes and will be described below, is extended to these projected portions 3 so that the electrode ends 6 form part of electrical contact portions 7. The pair of electrodes 5 are disposed mutually opposed on two laterally opposing inner surfaces 4 of the container 1 The electrodes 5 may be formed of any material having high electrical conductivity. If they are formed of aluminum sheets, pieces of adhesive aluminum tape or aluminum foil, or the like., the apparatus can be manufactured, at low cost, as a disposable apparatus.

The apparatus also includes a moisture permeable film body 8 which is film-shaped and is formed of a material having moisture permeability, such as a vinylon film, a piece of glassine paper, a piece of glassine paper treated with silicone, or any other suitable material. The moisture permeable film body 8 is removably disposed in the container 1 in such a manner that it is interposed between the electrodes 5 and a food material A received inside the container. This is advantageous in that, even when the pair of electrodes 5, which are formed of an aluminum material such as aluminum sheets or aluminum foils, are suffering from electrolytic corrosion to become partially broken into fine fragments, the moisture permeable film body 8 prevents aluminum fragments or an aluminum contaminated solution from penetrating into the food material A.

If the moisture permeable film body 8 has a figure substantially similar to the inner configuration of the container 1, as shown in FIG. 3, the pair of electrodes 5 are disposed in mutual opposition in the container 1 in the gaps between the two laterally opposing inner surfaces 4 and the mated two outer surfaces 9 of the film body 8.

The moisture permeable film body 8 disposed inside the container 1 receives therein a food material A, and water B containing a suitable amount of an electrolyte (e.g., salt). The food material A may be any of noodles such as Chinese-style noodles and wheat noodles, a rice-cooking material, beans, peas, soups such as miso-soup, etc. The electrical contact portions 7 allow the connection thereto of connectors 10. When the connectors 10 are connected to the contact portions 7, electricity is supplied to the pair of electrodes 5 so that current flows therebetween.

Any one of the inner periphery of the container 1, the outer periphery of the moisture permeable film body 8 and the pair of electrodes 5, or all of these portions may be supplied with an electrolytic substance, which is either an electrolyte (e.g., salt) or a solution containing an electrolyte at a suitable concentration (for example, salt water), by a suitable means such as a spray or a brush before cooking starts. This is advantageous because, when cooking is to be started, no electrolyte has to be received in the container 1 together with the food material to be cooked and water.

Figure 4:
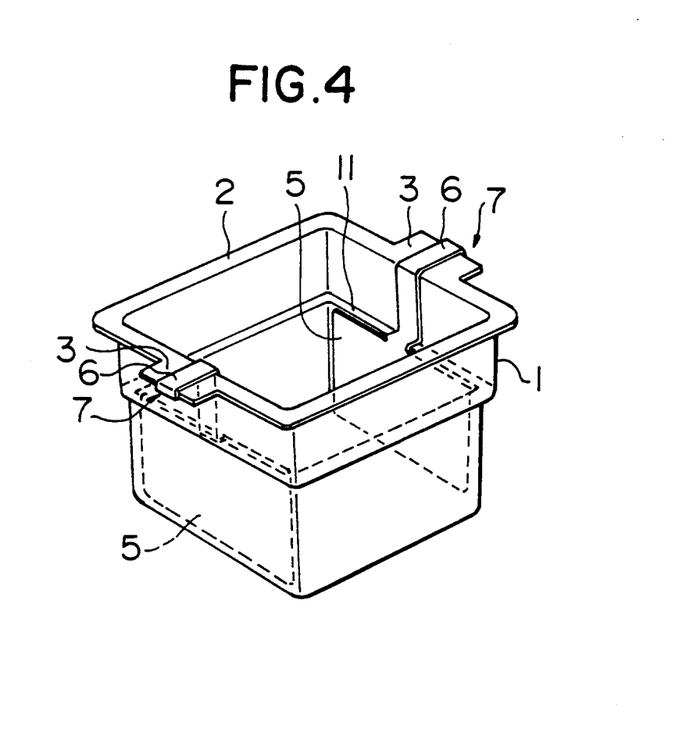
FIG. 4 is a view of an electrically heating food-preparation apparatus, illustrating another embodiment.
Figure 5:
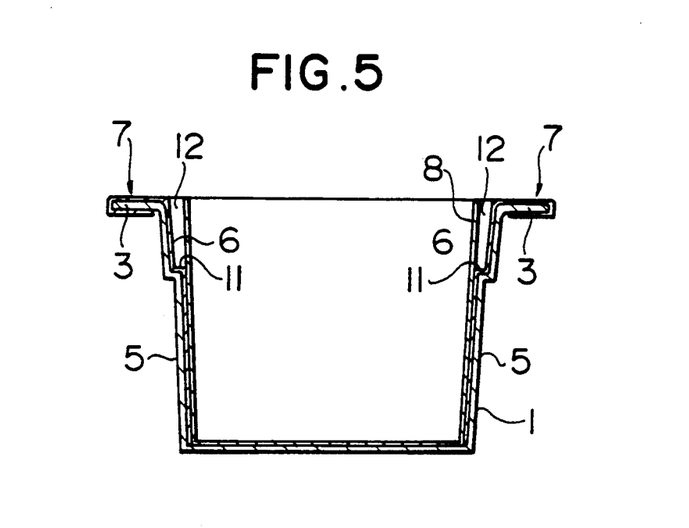
FIG. 5 is a view corresponding to FIG. 2, illustrating the embodiment shown in FIG. 4.

FIGS. 4 and 5 illustrate another embodiment of an electrically heating food-preparation apparatus. The apparatus includes a closed-end container 1 having an open top and being formed of an insulating material. A stepped portion 11 having an increased diameter and outwardly projecting is formed at an upper position of the inner surface of the container 1 throughout the entire circumference thereof. The increased-diameter stepped portion 11 defines a space 12 in cooperation with a moisture permeable film body 8 disposed inside the container 1, as shown in FIG. 5. The formation of the space 12 between the stepped portion 11 and the moisture permeable film body 8 provides the following advantage. During electric heating, even in the event that boiling bubbles generated from the surfaces of the pair of electrodes 5 rush upward through the relatively narrow gap adjacent to the moisture permeable film body 8, when the bubbles pass the stepped portion 11 to reach the relatively wide space 12, the speed of ascending of the bubbles rapidly drops, and they become small bubbles which will be gradually dissipated. Even when a large amount of boiling bubbles is generated, the formation of the space 12 makes it possible to prevent bubbles from flowing over the edge 2 around the upper open end of the container 1 The second embodiment shown in FIGS. 4 and 5 has the same construction as that shown in FIGS. 1 to 3 except for the above-described arrangement.

FIGS. 6 and 7 illustrate still another embodiment. A pair of electrodes 5 disposed in mutual opposition on two laterally opposing inner surfaces 4 of the container 1 are covered with bag-shaped moisture permeable film bodies 8a. As shown in FIG. 7, each of the moisture permeable film bodies 8 is bag-shaped with an open upper end, and receives one of the electrodes 5 therein. By virtue of this arrangement, the moisture permeable bodies 8a are able to easily comply with containers having various different inner configurations, thereby eliminating the need for moisture permeable film bodies of different configurations to be formed in compliance with various configurations of containers. The bag-shaped moisture permeable bodies 8a are also advantageous in that, even after a food material A is received in the container 1 together with water B, the bag-shaped moisture permeable bodies 8a receiving the electrodes 5 therein can be disposed in mutual opposition on lateral inner surfaces 4 of the container 1, and electric heating can be smoothly started. Although in the illustrated example, the upper ends of the bag-shaped film bodies 8a are open, they may alternatively be closed.

In this embodiment, if, before electric heating starts, an electrolytic substance (for example, salt or salt water) is supplied to or added to the inside of the bag-shaped moisture permeable film bodies 8a, the following advantage is provided. The electrolytic substance acts through the bag-shaped moisture permeable bodies 8a to quickly absorb moisture from the food material A, thereby promoting the wetting of the film bodies 8a, hence, promoting the electrical conduction between the electrodes 8 and the food material A.

Figure 8:
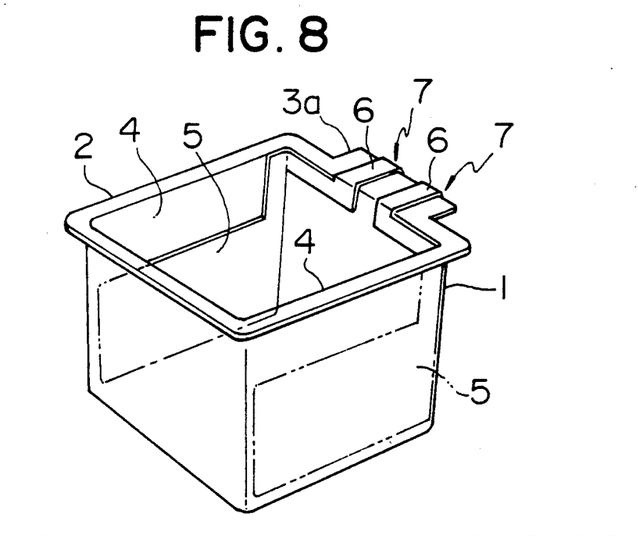
FIG. 8 is a perspective view of the entire structure of an electrically heating food-preparation apparatus, illustrating a further embodiment.

FIG. 8 shows a further embodiment which is distinguished from the foregoing embodiments in that electricity is supplied to a pair of electrodes 5 disposed mutually opposed in a container 1 from a position on one side of the container. Specifically, the container 1 of the apparatus according to this embodiment has a single projected portion 3a on one side of the edge 2 around the upper open end of the container 1. One end 6 of each of the electrodes 5 is disposed in parallel on this projected portion 3a so as to form a pair of electric contact portions 7.

A pair of electric contact portions 7 formed on two mutually opposing sides or on one side of the edge 2 around the upper open end of the container 1 are brought into contact with any of the means shown in FIGS. 9A to 9E so that the pair of electrodes 5 is supplied with electricity.

Figure 9A:
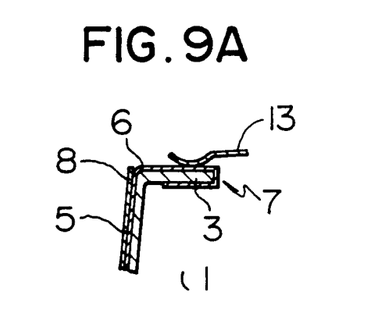
FIG. 9A is a fragmentary vertical sectional view taken from the front which shows a contact piece connected to an upper surface of an electrical contact portion.
Figure 9B:
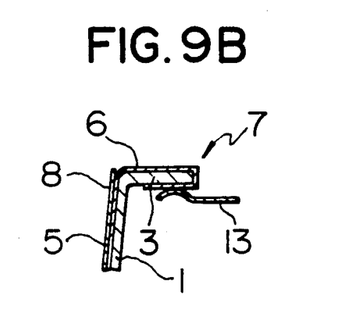
FIG. 9B is a similar view showing a contact piece connected to a lower surface of an electrical contact portion.
Figure 9C:
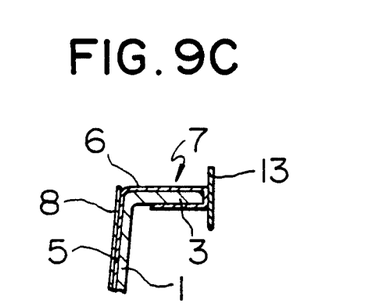
FIG. 9C is a similar view showing a contact piece connected to an end surface of an electrical contact portion.
Figure 9D:
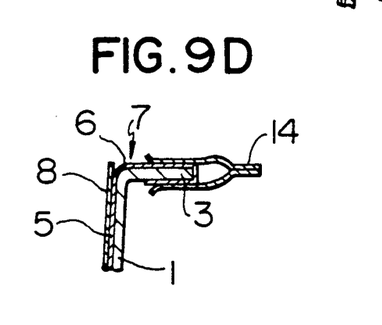
FIG. 9D is a similar view showing a bifurcate connector engaging with an electrical contact portion.
Figure 9E:
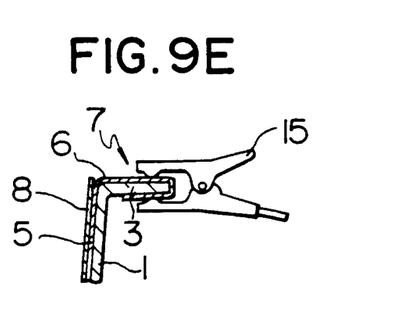
FIG. 9E is a similar view showing a clip-shaped connector engaging with an electrical contact portion.

FIG. 9A shows a contact piece 13 connected to the upper surface of an electric contact portion 7. FIG. 9B shows a contact piece 13 connected to the lower surface of an electric contact portion 7. FIG. 9C shows a contact piece 13 connected to the end surface of an electric contact portion. FIG. 9D shows a bifurcate connector 14 engaging with an electric contact portion 7. FIG. 9E shows a clip-shaped connector 15 engaging with and connected to the electric contact portion 7. The apparatus according to the present invention may adopt any of the above-described means.

Figure 10:
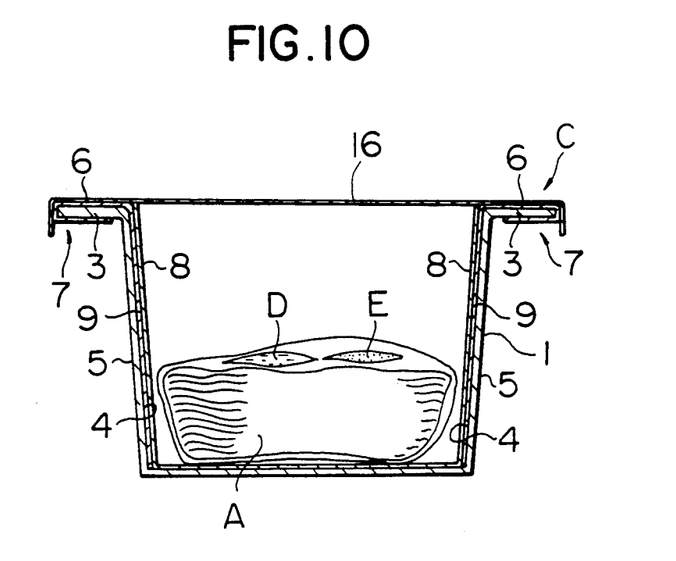
FIG. 10 is a view corresponding to FIGS. 2 and 5, showing a container receiving a food material yet to be cooked.

According to the present invention, a food is prepared in the following manner. As shown in FIG. 10, before cooking, a container 1 having its open top covered with a cover 16 is wrapped up in a suitable material, not shown, and serves as a container C receiving therein a material package. The material package contains a food material A consisting of, for example, dried Chinese-style noodles, a packaged seasoning material D to serve as a soup base, and packaged salt E for promoting electric heating. When the food material A is to be cooked by electric heating and by means of the container 1, the cover 16 is removed first, and the material package is broken. The food material A and the unpackaged seasoning material D are placed in the container 1. The seasoning material D consists of a powder of soup stock and a suitable amount of salt capable of acting as an electrolyte. Subsequently, 400 cc of water B at 6° C.

is poured into the container 1. At this time, the salt E and a small amount of water may preferably be poured into the gap between two mutually opposing inner surfaces 4 of the container 1 and the mating outer surfaces of a moisture permeable film body 8. When preparation is thus completed, electrical contact portions 7 are connected with contact pieces 13, or connector 14 or 15, and 100 V is applied.

When electrical contact is established in this way, current flows between a pair of electrodes 5 through the food material A and the moisture permeable film body 8. Five to six minutes after the start of the supply of electricity, Joule's heat generated thereby brings the water B inside the container 1 to the boil. The supply of electricity is terminated at this point. Rise in temperature of the food material A itself takes place after rise in temperature of the water B, and, when the supply of electricity is terminated, the food material A is heated to a certain extent. Thereafter, the food material A is heated by the water B which has been brought to the boil, until the food material A is heated sufficiently. Then, the food can be served readily.

The above described preparation requires a period which is not more than that required by the conventional practice of cooking instant noodles by boiling ordinary cold water in a kettle or the like, and pouring boiling water over the food; rather, the preparation of food is advantageous in the following. Since the water B is brought to the boil, the food material, for example, instant Chinese-style noodles, can be cooked very successfully. Since fine fragments or pieces or a solution thereof resulting from electrolytic corrosion of the electrodes 5 can be separated from the food by the moisture permeable body 8 or bodies 8a, it is possible to assure satisfactorily high level of sanitation and safety. The method or the apparatus of the present invention achieves a much higher heat efficiency than an electronic oven, thereby enabling a reduction in the necessary amount of electric power. Thus, the present invention enables a cooked food, which is evenly warmed or heated, to be prepared within a very short period of time by any person.

The methods and apparatuses of the present invention having the above-described arrangement provide the following advantageous effects.

A food can be cooked, regardless of whether it is a food material processed as instant food or a food material unprocessed, by placing it inside a container together with an electrolyte and water, and warming and/or heating it by the action of a pair of electrodes which are disposed in opposition in the container and between which current flows, without requiring the use of hot water or an electronic oven.

A food material placed inside the container can be sufficiently heated within a very short period of time. Therefore, such unprocessed food materials as a Chinese-style noodle material and an ordinary rice-cooking material including unprocessed rice can also be prepared to be served.

The container, and the like can be disposed when the foods have been finished. Therefore, the apparatus can be manufactured at low cost.

Even when fine fragments or pieces or a solution thereof are generated by electrolytic corrosion of the electrodes, they can be separated from the food by the moisture permeable body or bodies. Therefore, it is possible to assure satisfactorily high level of sanitation and safety.

In an early stage of electric heating, an electrolyte and water may be supplied to the pair of electrodes. This brings the electrodes and the outer periphery of the moisture permeable film body or bodies to their wet state so as to enhance electrical conduction. Thus, the wetting of the moisture permeable body or bodies may be promoted from the outer side thereof in an early stage of the supply of electricity, thereby promoting the flow of current. If this arrangement is adapted, it is possible to cook a food material by warming or heating it within a shorter period of time.

A food material received in a container together with a suitable amount of an electrolyte and a suitable amount of water may be warmed or heated by causing current to flow between a pair of electrodes having surfaces covered with moisture permeable film bodies and being disposed on two mutually opposing inner surfaces of the container. The adaptation of this arrangement is advantageous in that the electrodes and the film bodies can be combined with containers of various different inner configurations because they can be easily and quickly be disposed on the pertinent inner surfaces of the container. In addition, this arrangement also allows an electrolytic substance to be supplied, in an early stage of electric heating, to the electrodes received in the film bodies so as to promote the flow of current. Therefore, the food material can be cooked by being warmed or heated within a shorter period of time.

If an electrolytic substance is already supplied to any one of the inner periphery of the container, the outer periphery of the moisture permeable film body, and the electrodes, or all of these portions, it is possible to eliminate the need for an electrolyte to be received in the container together with a food material and water when electric heating is to be entered.

If the container has an increased-diameter stepped portion formed at an upper position of the inner surface thereof, and a space is defined between the increased-diameter stepped portion and the mating portion of the moisture permeable film body disposed inside the container, the following advantage is provided. Even when boiling bubbles generated from the surfaces of the pair of electrodes rush upward, it is possible to reduce bubbles into small bubbles in the space and dissipate them. Further, even when a large amount of boiling bubbles is generated, it is possible to prevent bubbles from flowing over the edge around the upper open end of the container.

If a pair of electrodes covered with moisture permeable film bodies is disposed in mutual opposition on two mutually opposing inner surfaces of a container having an open upper end, with one end of one electrode and that of the other extending to mutually opposing portions of the edge around an upper open end of the container in such a manner as to form electric contact portions, the following advantage is provided. The electrodes can be combined with containers having various different configuration, and they can be easily disposed in mutual opposition on pertinent inner surfaces of the container to carry out electric heating. In addition, the thus formed electrical contact portions can be simply connected with suitable contact piece or connecter to positively carry out electric heating.

If the moisture permeable bodies are bag-shaped and receives therein the electrodes, this arrangement enables the pair of electrodes to be disposed in mutual opposition on the pertinent inner surfaces of the container even when the container already receives a food material and water, and electric heating can be easily entered. Also in this case, an electrolytic substance may be already supplied to the inside of the bag-shaped moisture permeable bodies because the thus supplied electrolytic substance acts through the moisture permeable film bodies to quickly absorb moisture of the food material, thereby promoting the wetting of the film bodies, hence, promoting the electrical conduction between the electrodes and the food material.

The electrical contact portions are formed either by slightly outwardly projecting mutually opposing portions of the edge around the upper open end of the container and extending ends of the pair of electrodes to the projected portions, or by slightly outwardly projecting a portion on one side of the edge around the upper open end of the container and disposing the ends of the electrodes in parallel on this single projected portion. Therefore, electricity can be positively supplied through the electrical contact portions not excepting the case where the ends of the pair of electrodes extend in opposite directions.

What is claimed is:

1. An apparatus for preparing foods by utilizing electric heating comprising:
    a container having an open upper end and two mutually opposing inner surfaces;
    a moisture permeable film member having a configuration substantially corresponding to that of said container, said film member being disposed inside said container and having two outer surfaces facing said two mutually opposing inner surfaces of said container; and
    a pair of electrodes mutually opposed to each other and disposed in the gaps formed between one of said two mutually opposing inner surfaces of said container and corresponding one of said two outer surfaces of said moisture permeable film member, one end of each of said electrodes extending to the edge around the upper open end of said container to form a pair of electrical contact portions wherein food placed in said container onto said moisture permeable film member is prevented from mixing with any materials developed by electrolytic corrosion of said electrodes.

2. An apparatus according to claim 1, wherein either of the inner surface of said container and the outer surface of said moisture permeable film member is already supplied with an electrolytic substance.

3. An apparatus according to claim 1, wherein said electrodes are already supplied with an electrolytic substance.

4. An apparatus according to claim 1, wherein the inner surface of said container, said electrodes and the outer surface of said moisture permeable film body are already supplied with an electrolytic substance.

5. An apparatus according to claim 1, further comprising a stepped portion (11) with an increased diameter which is formed at an upper position of the inner surface of said container.

6. An apparatus according to claim 1, further comprising a stepped portion with an increased diameter which is formed at an upper position of the inner surface of said container, and a space defined between said stepped portion of said container and said moisture permeable film member disposed inside said container, said space allowing for the dissipation of boiling bubbles.

7. An apparatus according to claim 1, wherein said edge around said upper open end of said container has mutually opposing portions which slightly project outwardly, said ends of said electrodes respectively extending to the outwardly projecting portions to form a pair of electrical contact portions.

8. An apparatus according to claim 1, wherein said edge around said upper open end of said container has a portion on one side thereof which slightly projects outwardly, both of said ends of said electrodes extending in a parallel manner to the outwardly projecting portion to form a pair of electrical contact portions.

9. An apparatus for preparing foods by utilizing electric heating comprising:
    a container having an open upper end and two mutually opposing inner surfaces;
    a pair of electrodes disposed in mutual opposition on said two mutually opposing inner surfaces of said container; and
    at least one moisture permeable film member covering the surfaces of said electrodes, one end of each of said electrodes extending to the edge around the upper open end of said container to form a pair of electrical contact portions.

10. An apparatus according to claim 9, wherein an electrolytic substance is already supplied into said moisture permeable film members covering said electrodes.

11. An apparatus according to claim 9, wherein said edge around said upper open end of said container has mutually opposing portions which slightly project outwardly, said ends of said electrodes respectively extending to the outwardly projecting portions to form a pair of electrical contact portions.

12. An apparatus according to claim 9, wherein said edge around said upper open end of said container has a portion on one side thereof which slightly projects outwardly, both of said ends of said electrodes extending in a parallel manner to the outwardly projecting portion to form a pair of electrical contact portions.

13. An apparatus according to claim 9, wherein each of said electrodes is inserted in a bag-shaped moisture permeable film member.

* * * * *